July 30, 1940.  C. P. SWEENY  2,209,364
MOTOR CONTROL SYSTEM
Filed Nov. 14, 1938
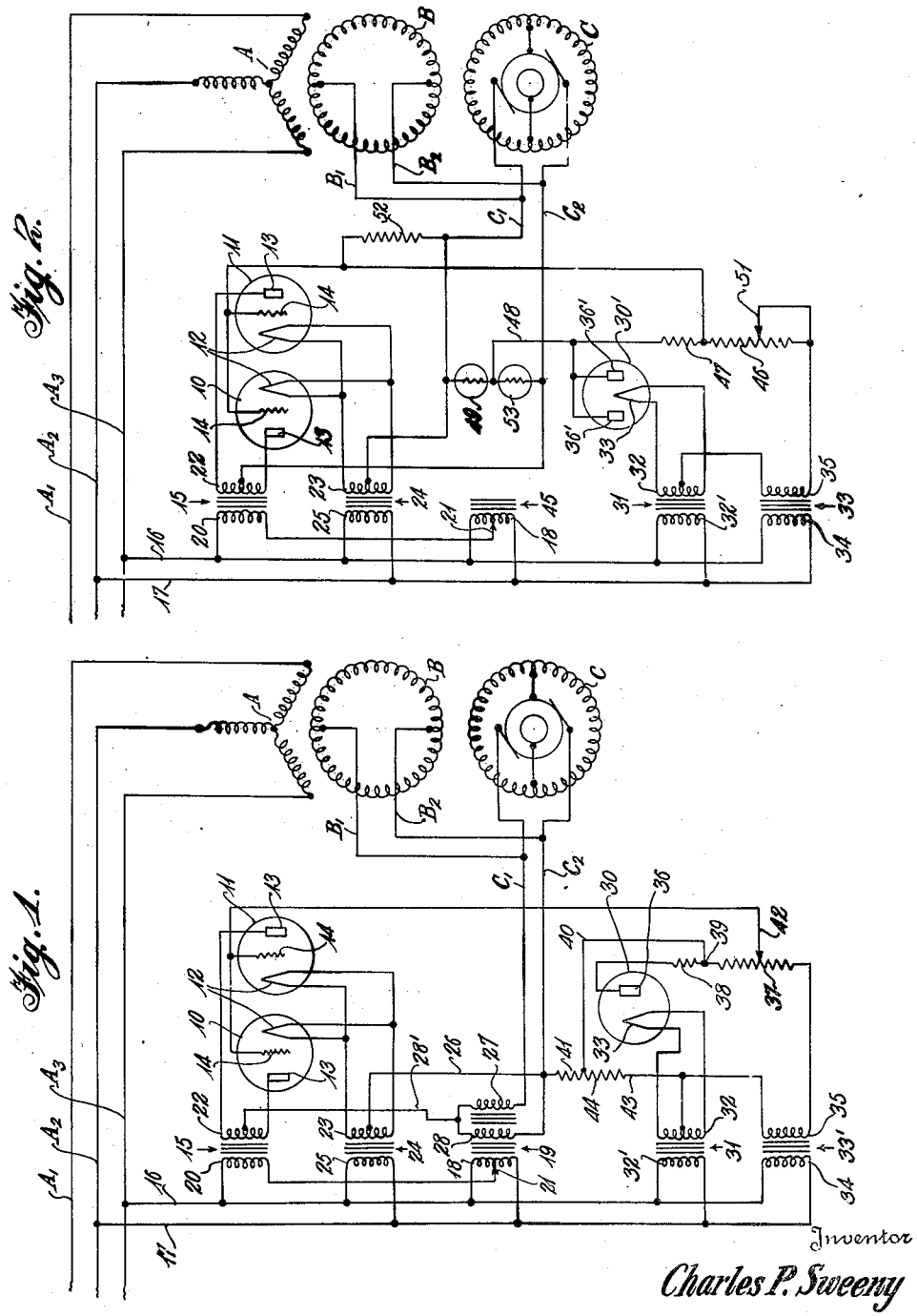
Inventor
Charles P. Sweeny
By Barnes, Kisselle, Laughlin & Raisch
Attorneys Patented July 30, 1940

2,209,364

UNITED STATES PATENT OFFICE 2,209,364

MOTOR CONTROL SYSTEM

Charles P. Sweeny, Detroit, Mich., assignor to Vickers, Incorporated, Detroit, Mich., a corporation of Michigan Application November 14, 1938, Serial No. 240,425

7 Claims. (Cl. 172—274)

This invention relates to motor control systems and more particularly to systems for controlling and stabilizing the operation of variable speed alternating current motors having direct current energization.

A variable speed alternating current motor, the speed of which can be varied by varying the direct current energization of certain windings of the motor, is disclosed in my co-pending application, Serial No. 72,632, filed April 3, 1936. This motor contains a primary alternating current winding upon one member of the motor, a secondary winding upon the other member of the motor and a supplemental control winding preferably positioned upon the member which supports the primary winding. The motor is essentially an induction motor in which a low power, direct current energization is applied to the control and secondary windings to provide for speed variation by varying the degree of such energization. In the motor referred to, increase of direct current energization decreases the speed of the motor and decrease of direct current energization increases the speed of the motor. The motor has been found to have an extremely wide speed variation and good regulation. That is to say, the speed does not vary widely under changing load conditions or changing line voltage conditions. There is, however, some variation of speed when load and voltage conditions change and the present invention is directed to a control system in which such speed variations are substantially entirely eliminated.

It is, therefore, an object of the present invention to provide a control system for improving the speed regulation of variable speed alternating current motors.

Another object of the invention is to provide a motor control system for alternating current motors having direct current energization for varying the speed thereof, which control system minimizes speed variation under varying load and voltage conditions.

Another object of the invention is to provide a motor control system in which the speed of an alternating current motor is charged by changing the direct current energization applied to the motor and in which the voltage of the direct current energization is automatically varied with changes in line voltage to maintain the speed of the motor substantially constant.

Another object of the invention is to provide a motor control system in which the speed of an alternating current motor having direct current energization is maintained substantially constant under varying voltage and load conditions by automatically varying the voltage of the direct current energization when the line voltage or load varies.

A further object of the invention is to provide a motor and control system in which the speed of an alternating current motor is varied by varying direct current energization of the motor and in which voltages induced in a secondary winding of the motor are employed to vary the direct current energization of the motor in order to maintain the speed of the motor substantially constant under varying loads.

Other objects and advantages of the invention will appear in the following description of preferred embodiments of the invention disclosed in the attached drawing, of which:

Fig. 1 is a schematic diagram of a motor control system of the present invention, and Fig. 2 is a similar diagram of a modified motor control system.

Referring more particularly to the drawing, A indicates a primary winding of the variable speed alternating current motor, which primary winding is energized from an alternating current source of power through the conductors $A_1$, $A_2$ and $A_3$. The winding A is shown as a three phase winding although other polyphase windings may be employed and even a single phase winding may be employed if supplemental starting coils or mechanism for the motor are provided. The winding A is ordinarily positioned upon the stator of the motor although obviously it may be positioned upon the rotor. A control winding B is preferably positioned upon the same member as the winding A and is energized from a source of direct current hereinafter described through the conductors $B_1$ and $B_2$. The A and B windings are preferably distributed windings occupying the same slots of the member upon which they are positioned and the conductors of the B winding are so positioned and connected that no resultant voltages appear across the conductors $B_1$ and $B_2$ when the A winding alone is energized. This can be done, for example, by employing a different number of poles for the B winding than for the A winding or in case the B winding has the same number of poles as the A winding, by positioning and connecting the coils of the B winding so that the voltages induced therein from the flux produced by the energization of the A winding oppose each other. In either case the conductors of the B winding are so positioned and connected that the B winding does not form a short circuit path for currents produced therein by induction from the A winding when the A winding alone is energized. Ordinarily, both the A and B windings are connected to produce four or more poles and as an example, the B winding may be connected to produce six poles, while A winding is connected to produce eight poles.

The secondary winding C is positioned on the other member of the motor and preferably upon the rotor. This winding is energized from the source of direct current above mentioned through conductors $C_1$ and $C_2$ and is preferably connected to produce two poles. A conventional two-pole distributed winding may be employed as a C winding but a better flux distribution is secured by employing a plurality of concentric coils disposed in slots for each pole. The greater the energization of B and C windings with direct current the slower the speed of the motor. The D. C. energization necessary to effect a wide range of speed control is small with comparison to the A. C. energization of the A winding such that the motor is essentially a variable speed alternating current motor. The voltage applied to the A winding for normal operation of the motor is sufficiently low that the iron in the motor is subnormally saturated and the power currents in the C winding are relatively small so that the power produced is relatively small in the absence of D. C. energization. Under these conditions, D. C. energization of either the B or C windings or both increases the saturation of the iron and distorts the flux from the A winding so that increased amounts thereof cut the conductors of the C winding. The greater the D. C. energization, the greater the power currents in the C winding and the slower the speed of the motor the greater the amount of power produced by the motor.

The D. C. energization for the motor is in accordance with the present invention derived from the same source of power as the A. C. energization. Rectifying devices shown as rectifying tubes 10 and 11 furnish the D. C. energization for the motor. These tubes are preferably gas filled power tubes containing heated cathodes 12, plates 13 and grids 14. Such tubes have substantially a constant voltage drop irrespective of the amount of current passing therethrough and the grids of the tubes will control the time of starting of current flow through the tubes but have no substantial control over the amount of current after current flow has started. Since the current through either tube 10 or 11 is zero for alternate half cycles of the alternating current power applied thereto, the grids are effective to control the time during which current flows through the tubes and thus the total amount of current. The tubes 10 and 11 are supplied with plate voltage from a plate transformer 15 receiving power from conductors 16 and 17 connected across conductors $A^1$ and $A^3$ forming one phase of the alternating current source of power. An auto transformer coil 18 forming part of a control reactor 19 is connected across the conductors 16 and 17. The primary winding 20 of the plate transformer 15 has one side connected to the conductor 16 and the other side connected to a variable tap 21 of the auto transformer coil 18. Thus, the primary 20 of the transformer 15 can be supplied with an alternating current voltage which can be varied by varying the position of the tap 21 of the auto transformer coil 18. The plates 13 of the tubes 10 and 11 are connected to opposite terminals of the center tapped secondary 22 of the transformer 15. Heating current is supplied to the cathodes 12 from a center tapped secondary 23 of a filament transformer 24 having a primary 25 connected across the conductors 16 and 17. The center tap of the secondary 23 of the filament transformer 24 is connected to the conductor $C_2$ by a conductor 26 and the path of direct current from the rectifier tubes 10 and 11 can be traced from the cathodes 12 through the center tap of the secondary 23, conductor 26 and conductor $C_2$ through the B and C windings and then through the conductor $C_1$, coil 27 of the control reactor 19 and conductor 28 to the center tap of the secondary 22 of the plate transformer 15. The control reactor also has a coil 29 connected between the center taps of the secondaries 22 and 23 of the transformers 15 and 24 by means of conductors 28 and 26 for purposes which will hereinafter appear.

The control reactor 19 has the auto transformer coil 18, the coil 27 and the coil 29 all mounted upon a single iron core. The coils 27 and 29 are preferably connected so that voltages induced therein by the flux produced by the auto transformer coil 18 oppose each other. The iron of the core of this reactor is operated at relatively high saturation so that there is substantial leakage flux between the turns of the auto transformer coil 18. The saturation of the iron of this device is maintained relatively high by the coil 29 connected across the direct current source and this coil has relatively high resistance to prevent excessive current flowing therethrough. It will be noted that the coils 27 and 29 are connected in series with the C winding. It has been found that the voltages induced in the secondary winding C increase in amplitude as the speed of the motor decreases due to load applied thereon and that greater currents from the C windings flow through the coils 27 and 29 as the speed of the motor decreases under load. These larger currents increase the saturation of the iron of the control reactor 19 to still further increase the leakage reactance of auto transformer coil 18 so as to decrease the voltage applied to the tubes 11 and 12 and thus the direct current energization of the windings B and C. Thus, as the speed of the motor tends to decrease under load, the D. C. energization of the windings B and C is decreased to prevent substantial decrease in speed of the motor under load. The normal speed of the motor can be set by moving the adjustable tap 21 of the auto transformer coil 18 to produce the desired motor speed and the changing saturation of the core of the control reactor 19 will maintain the set speed of the motor substantially constant under varying load.

A half wave rectifier shown as a tube 30 is employed in combination with the tubes 10 and 11 to maintain the speed of the motor substantially constant under conditions of varying voltage supplied by the alternating current source of power. This tube is preferably of the vacuum type, the output voltage of which is substantially proportional to the alternating input voltage. A filament transformer 31 having a center tapped secondary 32 and having a primary 32' connected across the conductors 16 and 17 may be employed to supply heating current to the cathode 33 of the tube 30. A plate transformer 33' having a primary 34 connected across the conductors 17 and 16 and a secondary 35 having one side connected to the center tap of the secondary 32 of the filament transformer 31 and the other side connected to the plate 36 of the tube 30 through resistors 37 and 38 may be employed to supply plate voltage for tube 30. The end 39 of the resistor 38 remote from the plate 36 is connected to the center tap of the secondary 23 of the filament transformer 24 of the tubes 10 and 11 through a conductor 40 and resistor 41 in order to tie the plate circuit of the tube 30 to the cathodes of the tubes 10 and 11. The grids 14 of the tubes 10 and 11 are connected to a slider 42 engaging resistor 37. Direct current due to rectification in the tube 30 will flow through resistor 37 so as to tend to hold the grids 14 of the tubes 10 and 11 positive with respect to the cathodes of these tubes due to I. R. drop in the portion of resistor 37 between the connection 39 and the slider 42. Since the tube 30 is a half wave rectifier, the grids 14 of the tubes 10 and 11 will be driven positive for approximately half of each cycle due to rectified current in tube 30. An alternating current shunt for the tube 30 is also provided, including a conductor 43 from one side of the secondary 35 of the plate transformer 33, resistor 44 and conductor 40 so that an alternating current component also flows through the resistor 37 and an alternating current potential is also superimposed on the pulsating direct current applied to the grid and tubes 14. The tubes 10 and 11 are preferably of the type in which no substantial current flows through the tubes unless the grids 14 have a positive bias applied thereto. This positive bias is supplied by the current flowing through the portion of the resistor 37 between connection 39 and slider 42. The characteristics of the tube 30 are such that this bias is increased at a greater rate than an increase of input voltage applied to the tube 30. Thus, upon increase in voltage from the alternating current source, which increase would tend to cause the motor to increase its speed, an increased bias is applied to the grids of the tubes 10 and 11 to increase the direct current energization of the windings B and C, which increased energization tends to decrease the speed of the motor such that the two effects compensate and the motor remains at substantially constant speed. The reverse effect occurs when the line voltage drops as the D. C. energization is decreased at a greater rate than the decrease in line voltage such that the speed of the motor remains substantially constant. Since the grids of the tubes 10 and 11 have a positive potential applied thereto, these grids take current which returns to the cathode of the tubes through resistor 41 and conductor 26. The I. R. drop in the resistor 41 is in a direction to decrease the positive potential of the tubes so that the positive potential applied by the resistor 37 is in part compensated to stabilize the operation of the device.

In operation, tubes 10 and 11 provide D. C. energization for the windings B and C of the motor, which D. C. energization, and thus the speed of the motor, can be varied by moving the variable tap 21 of the auto transformer coil 18. This D. C. energization then remains substantially constant under constant load and line voltage conditions. If the load on the motor varies, tending to vary the speed of the motor, changing currents in the coils 27 and 28 of the control reactor vary the leakage reactance of the auto transformer coil 18 so as to vary the D. C. energization of the motor and retain the speed of the motor substantially constant under varying load conditions. If the line voltage varies, thereby tending to vary the speed of the motor, the tube 30 causes the positive potential applied to the grids 14 of the tubes 10 and 11 to increase or decrease faster than the increase or decrease, respectively, of line voltage so that the D. C. energization of the windings B and C increases or decreases at a faster rate than the increase or decrease, respectively, of the line voltage; the speed of the motor is thereby retained substantially constant under varying voltage conditions.

The modification shown in Fig. 2 is similar in many respects to the modification shown in Fig. 1 and produces substantially the same results. The same reference characters have been employed in this modification where the elements are the same as those in Fig. 1. In the system of this figure, no control reactor is employed and a simple auto transformer or other voltage varying device 45 is employed to vary the voltage applied across the plates and cathodes of the tubes 10 and 11. The D. C. energization of the windings B and C can be varied by moving the adjustable tap 21 of the auto transformer winding 18 in order to vary the speed of the motor. The tube 31' controlling the bias of the grids 14 and tubes 10 and 11 may be substantially the same as the tube 30 of Fig. 1 but is connected to the tubes 10 and 11 in a somewhat different manner. Tube 30' provides half wave rectification and the pulsating direct current produced thereby flows from the center tap of the secondary winding 32 of the filament transformer 31 through the secondary winding 35 of the plate transformer 33 and then through resistors 46 and 47 to the plates 36' of the tube 30'. The plates 36' of the tube 30' are tied to the cathodes 12 of the tubes 10 and 11 through a conductor 48 and a resistor shown as a lamp 49 which has a high positive temperature coefficient of resistance. The grids 14 of the tubes 10 and 11 are connected to the end of the resistor 47 remote from the plates 36' of the tube 30 so that the rectified current flowing through the resistor 37 applies a pulsating positive potential to the grids 12. The amount of current flowing through the resistor 47 and thus the average potential of the grids 14 can be adjusted by moving the slider 51 of the resistor 46. The tube 30' varies the positive bias of the grids 14 of the tubes 10 and 11 as the line voltage varies so as to cause the direct current energization of the windings B and C to be increased or decreased at a greater rate than the increase or decrease, respectively, of the line voltage in order to maintain the speed of the motor substantially constant under conditions of varying line voltage. Grid current flowing through the resistance of lamp 49 tends to decrease this positive potential in order to provide for partial compensation of the positive grid bias to render the system stable. Also, grid current flowing through a high resistant 52 connected between the grids and the cathodes 12 has a similar compensating action stabilizing operation of the system.

The lamp 49 and also a similar lamp 53 connected across the conductors $C_1$ and $C_2$ in series with the lamp 49 are employed to maintain the speed of the motor substantially constant under varying load conditions and perform substantially the same function as the control reactors 19 of Fig. 1. It has been found that increased load upon the motor tending to slow the motor down causes increased voltages in the secondary winding C. These voltages are applied across lamps 49 and 53 in series and cause increased current flow through the lamps 49 and 53 when the load of the motor increases. This increases the temperature of the filaments of the lamps which have a high positive temperature coefficient resistance to increase the resistance of the lamp 49. The grid current of the tubes 10 and 11 flows through the lamp 49 such that the positive bias on the grids is decreased as the temperature of the filament of lamp 49 increases. Thus, as load upon the motor is increased, the positive bias of the grids 14 of the tubes 10 and 11 is decreased to decrease the output of these tubes and therefore decrease the direct current energization of the windings B and C. This decreased energization prevents substantial decrease of the speed of the motor. The opposite effect takes place when load on the motor decreases, such that the speed of the motor is maintained substantially constant under varying loads. Thus the motor control system of Fig. 2 as well as that of Fig. 1 maintains the speed of a variable speed alternating current motor having D. C. energization, substantially constant under both varying load and varying line voltage conditions.

While I have disclosed the preferred embodiments of my invention, it is understood that I am not to be limited to the precise disclosure thereof, but the details may be varied within the scope of the following claims:

What I claim is:

1. In a motor control system, a source of alternating current power, a rectifying device receiving power from said source and constituting a source of direct current power, an alternating current motor of the induction type having relatively rotatable members a primary winding upon one of said members energized from said source of alternating current power, a secondary winding upon the other of said members, and a control winding upon said one of said members and energized from said source of direct current power for varying the normal speed of said motor inversely to the amount of D. C. energization of said secondary winding, a second rectifying device receiving power from said alternating current source of power for controlling said first rectifying device to increase or decrease the direct current energization of said control winding at a greater rate than the increase or decrease, respectively, of voltage of said alternating source of power, in order to stabilize the speed of said motor under varying voltage conditions of said alternating current source of power.

2. In a motor control system for stabilizing the speed of a variable speed alternating current motor of the induction type under variable voltage conditions applied thereto, an alternating current source of power, means receiving energy from said source of power for converting alternating current into direct current, a variable speed alternating current motor of the induction type having relatively rotatable members a primary winding upon one of said members and energized from said source of alternating current power, a secondary winding upon the other of said members, and a control winding upon said one of said members and energized from said means to vary the speed of the motor inversely to the direct current energization supplied by said means, means responsive to the voltage of said alternating current source of power for controlling said first-named means to increase or decrease the direct current energization of said control winding at a greater rate than the increase or decrease respectively of the voltage of said alternating current source of power, in order to maintain the speed of said motor substantially constant under varying voltage conditions of said alternating source of power.

3. In a motor control system for maintaining the speed of a variable speed alternating current motor substantially constant under varying voltage conditions of the alternating current power applied to said motor, which comprises, an alternating current source of power, a direct current source of power receiving alternating current power from said alternating current source of power and converting the same into direct current power, a variable speed alternating current motor having relatively rotatable members a primary winding upon one of said members and energized from said source of alternating current power, a secondary winding upon the other of said members and a control winding upon said one of said members and energized from said direct current source of power to vary the speed of said motor inversely to the direct current energization of said secondary winding, means responsive to the voltage of said alternating current source of power for controlling said direct current source of power so as to vary the direct current energization of said control winding to maintain the speed of said motor substantially constant under varying voltage conditions of said alternating current source of power.

4. In a motor control system for stabilizing the speed of an alternating current motor of the type which varies its speed under variable voltage conditions of the alternating current power applied thereto, which comprises, an alternating current source of power, a direct current source of power receiving alternating current power from said alternating current source of power and converting the same to said direct power, an alternating current motor having relatively rotatable members a primary winding upon one of said members and energized from said alternating current source of power, a secondary winding upon the other of said members, and a control winding upon said one of said members and energized from said direct current source of power to vary the speed of said motor as the direct current energization of said last-mentioned winding is varied, manually actuated means for varying the output of said direct current source of power for varying the speed of said motor and means responsive to the voltage of said alternating current source of power for varying the output of said direct current source of power as the voltage of said alternating current source of power varies to maintain the speed of said motor substantially constant under varying voltage conditions of said alternating current source of power.

5. In a motor control system for stabilizing the speed of an alternating current motor of the type which varies its speed under variable voltage conditions of the alternating current power applied thereto, which comprises, an alternating current source of power, a direct current source of power receiving alternating current power from said alternating current source of power and converting the same to said direct power, an alternating current motor having relatively rotatable members a primary winding upon one of said members and energized from said alternating current source of power, a secondary winding upon the other of said members, and a control winding upon said one of said members and energized from said direct current source of power to vary the speed of said motor as the direct current energization of said last-mentioned winding is varied, means responsive to voltages induced in said secondary winding for varying the output of the direct current source of power to compensate for variations in motor speed under varying load conditions, and means responsive to the voltage of said alternating current source of power for varying the output of said direct current source of power as the voltage of said alternating current source of power varies to maintain the speed of said motor substantially constant under varying voltage conditions of said alternating current source of power.

6. In a motor control system for stabilizing the speed of an alternating current motor of the type which varies its speed under variable voltage conditions of the alternating current power applied thereto, which comprises, an alternating current source of power, a direct current source of power receiving alternating current power from said alternating current source of power and converting the same to said direct power, an alternating current motor having relatively rotatable members a primary winding upon one of said members and energized from said alternating current source of power, a secondary winding upon the other of said members, and a control winding upon said one of said members and energized from said direct current source of power to vary the speed of said motor as the direct current energization of said last-mentioned winding is varied, means including a saturable core transformer, responsive to voltages induced in said secondary winding for varying the output of the direct current source of power to compensate for variations in motor speed under varying load conditions, and means responsive to the voltage of said alternating current source of power for varying the output of said direct current source of power as the voltage of said alternating current source of power varies to maintain the speed of said motor substantially constant under varying voltage conditions of said alternating current source of power.

7. In a motor control system for stabilizing the speed of an alternating current motor of the type which varies its speed under variable voltage conditions of the alternating current power applied thereto, which comprises, an alternating current source of power, a direct current source of power receiving alternating current power from said alternating current source of power and converting the same to said direct power, an alternating current motor having relatively rotatable members a primary winding upon one of said members and energized from said alternating current source of power, a secondary winding upon the other of said members, and a control winding upon said one of said members and energized from said direct current source of power to vary the speed of said motor as the direct current energization of said last-mentioned winding is varied, means including a heated resistor having a high positive temperature coefficient of resistance, responsive to voltages induced in said second winding for varying the output of the direct current source of power to compensate for variations in motor speed under varying load conditions, and means responsive to the voltage of said alternating current source of power for varying the output of said direct current source of power as the voltage of said alternating current source of power varies to maintain the speed of said motor substantially constant under varying voltage conditions of said alternating current source of power.

CHARLES P. SWEENY.